United States Patent Office 3,697,468
Patented Oct. 10, 1972

3,697,468
ETHYLENE/METHYL METHACRYLATE HOT TACK BARRIER COATINGS
Edward C. Ballard, Wilmington, Del., assignor to E. I. du Pont de Nemours and Company, Wilmington, Del.
No Drawing. Continuation-in-part of application Ser. No. 677,750, Oct. 24, 1967. This application Dec. 16, 1970, Ser. No. 98,858
Int. Cl. C08f 45/52
U.S. Cl. 260—28.5 AV                2 Claims

ABSTRACT OF THE DISCLOSURE

Hot tack at low melt viscosity is provided by barrier coatings for form-fill packaging consisting essentially of (a) 20 to 50 percent by weight of ethylene/acrylic polymer consisting essentially of ethylene, 18 to 35 weight percent of acrylic ester of the general formula

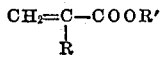

wherein R is H or $CH_3$ and R' is alkyl of 1 to 4 carbon atoms, and 0 to 10 weight percent methacrylic acid, (b) 0 to 40 weight percent alkyl aromatic polymer and (c) paraffin wax to make 100 percent.

CROSS-REFERENCE TO RELATED APPLICATION

This application is a continuation-in-part of U.S. application Ser. No. 677,750, filed Oct. 24, 1967 and now abandoned.

BACKGROUND OF THE INVENTION

Heat sealable barrier coatings in form-fill packaging of snack foods need hot tack or hot adhesive strength characteristics. This enables a coating to resist cohesive failure on application of stress immediately after being removed from the hot sealing jaws of the form-fill machine. Many compositions hitherto developed with suitable barrier properties and adequate hot tack have also had melt viscosities of greater than 15 M cps. at 300° F. Since the bulk of existing machinery cannot handle blend viscosities above 10 M cps. at 300° F., a need exists for effective barrier coatings of lower melt viscosity. Typical formulations hitherto proposed along with methods of testing and using them are those of U.S. Pats. 3,232,798, 3,215,657, 3,294,722 and 3,306,882.

SUMMARY OF THE INVENTION

A barrier coating for form-fill packaging consisting essntially by weight of (a) 20 to 50 percent ethylene/acrylic polymer consisting essentially of ethylene, 18 to 35 weight percent of acrylic ester of the general formula

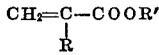

wherein R is H or $CH_3$ and R' is alkyl of 1 to 4 carbon atoms, and 0 to 10 weight percent methacrylic acid, (b) 0 to 40 percent alkyl aromatic polymer and (c) paraffin wax. Optionally, the composition contains an antioxidant.

DETAILED DESCRIPTION AND PREFERRED EMBODIMENTS

The formulations may be applied to flexible substrates by the "kiss and scrape" coating method. In the following, parts and percentages are by weight, except as noted.

EXAMPLE 1

A hot melt was prepared by melting 52 parts of paraffin wax in a suitable metal container. To the molten wax was added 0.1 to part of butylated hydroxytoluene (BHT) as antioxidant, and 30 parts of ethylene/methyl methacrylate copolymer (26% methyl methacrylate, MI 3.7). When a homogeneous polymer/wax solution was attained, 18 parts of teradditive resin, a commercial copolymer containing 25 to 28 weight percent alpha-methyl styrene and 72 to 75 weight percent vinyl toluene ("Piccotex" 120, a product of the Pennsylvania Industrial Chemical Corporation) was added, and the blend was heated at 300 to 350° F. with stirring for one to three hours. The blend viscosity was 5.6 M cps. at 300° F., measured with a Brookfield Model LVT Viscometer.

The hot met (30/18/52 ethylene methacrylate copolymer/alpha-methyl styrene-vinyl toluene copolymer/paraffin wax) was applied to 30 lb. glassine using a laboratory "kiss and scrape" roll coater to give a range of coating weights (5–15 lbs./ream), varying the coating weight by controlling the coating temperature and the tension on the paper web. The moisture-barrier properties by the standard TAPPI cup method were 0.25 g./100 sq. in./24 hr.-flat, and 0.40 g./100 sq. in./24 hr.-creased comparing favorably with conventional hot melt coatings.

Hot tack was determined by a laboratory test found to correlate with form-fill machine performance. The laboratory method used a set of calibrated springs of different stiffness and a Sentinel heat sealer. The coated substrate was sealed and tested with a given spring at several seal temperatures and dwell times. The number of hot tack passes or times where a coating resisted the separating force of a certain spring was used as a quantitative measure of the hot tack of a given formulation.

Hot tack performance at a given blend viscosity of a 30/18/52 ethylene/methyl methacrylate (26% methyl methacrylate, 3.7 MI)/"Piccotex" 120/wax blend was superior to the corresponding blend containing ethylene/vinyl acetate copolymer (28% vinyl acetate; MI 6) and equal to a blend containing ethylene/vinyl acetate/methacrylic acid terpolymer (28% vinyl acetate, 1% methacrylic acid; MI 6). In other words, the blend viscosity of ethylene/methyl methacrylate copolymer and ethylene/vinyl acetate/methacrylic acid terpolymer blends was lower than the corresponding ethylene/vinyl acetate copolymer blend when the three blends had about the same hot tack performance.

EXAMPLE 2

A hot melt composition similar to one described in Example 1 was prepared but with no teradditive component. The blend viscosity at 300° F. was about 35% higher (7.7 M cps.) than the corresponding blend having the same polymer/wax ratio which contained 18 weight percent alpha-methyl styrene/vinyl toluene teradditive. Also, the blend containing teradditives had slightly higher hot tack than the binary blend.

EXAMPLE 3

A hot melt was prepared containing 35/25/40 ethylene-methyl methacrylate-methacrylic acid (20% methyl methacrylate, 5% methacrylic acid, MI 18)/alpha-methyl styrene-vinyl toluene copolymer/paraffin wax. This composition had a hot tack performance/viscosity balance superior to the corresponding blend containing conventional ethylene/vinyl acetate resin and equal or slightly superior to blends containing either neutral ethylene/methyl methacrylate copolymers or ethylene/vinyl acetate/methacrylic acid terpolymers. The viscosity at 300° F. was 9 M cps.

EXAMPLE 4

A hot melt was prepared containing by weight 35/65 (ethylene/isobutyl acrylate 30 percent isobutyl acrylate; MI 2.2)/paraffin wax. The composition had a viscosity of 9 M cps. at 300° F. and a hot tack/viscosity balance superior to the corresponding blend containing conventional ethylene/vinyl acetate resin.

EXAMPLE 5

A hot melt was prepared containing by weight 30/18/52 (ethylene/isobutyl acrylate/methacrylic acid 30 percent isobutyl acrylate, 1.1 percent methacrylic acid MI 2.2)/ "Piccotex" 120/paraffin wax. The composition had a viscosity of less than 10 M cps. at 300° F. and a hot tack/viscosity balance superior to the product of the preceding example.

It is possible to alter the ratio of components in Example 1 without hindering hot tack performance. The following coating composition limits all have some measure of hot tack: 20–50% by weight of an ethylene/acrylic ester copolymer or an ethylene/acrylic ester/methacrylic acid terpolymer containing 18–35% by weight acrylic ester and up to 10% by weight methacrylic acid, 0–40% by weight of an alkyl aromatic polymer, and paraffin wax to make 100%. The composition may optionally contain an antioxidant.

The addition of a teradditive resin, such as an alpha-methyl styrene/vinyl toluene copolymer ("Piccotex" 120), serves to lower the blend viscosity at coating temperature 300 to 325° F. For example, addition of "Piccotex" 120 to a 37/63 ethylene-methyl methacrylate copolymer/wax blend to obtain a ternary formulation containing 18% teradditive lowers the melt viscosity at 300° F. from 7.7 M cps. to 5.6 M cps. "Piccotex" 120 addition to ethylene/methyl methacrylate copolymer/wax blends also slightly enhances the hot tack performance. Other effective teradditives include Alphaprene G–100 (styrene/vinyl toluene copolymer, Reichhold Chemical Company) and Amoco TSLO 182–62 (dimethyl-alpha-methyl styrene/vinyl toluene, Amoco Chemicals Company). All these resins are of the vinyl aromatic chemical type.

The ethylene/methyl methacrylate binary and ternary blends generally had good gloss, and no unusual coating difficulties were experienced on the 6-inch roll coater. The moisture barrier properties of the 30/18/52 ethylene/ methyl methacrylate copolymer (26% methyl methacrylate, 3.7 MI)/"Piccotex" 120/Atlantic 1116 wax blend were about equivalent to the corresponding composition containing conventional ethylene/vinyl acetate resins. The paraffin wax may contain up to about 5% microcrystalline wax to improve gloss without interfering with moisture resistance.

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

I claim:

1. A barrier coating composition consisting essentially of, by weight, (a) 30 percent ethylene/methyl methacrylate polymer consisting essentially of 74 weight percent ethylene, and 26 weight percent methyl methacrylate, (b) 18 percent copolymer consisting essentially of 72 to 75 percent vinyl toluene and 25 to 28 percent alpha-methyl styrene, and (c) 52 percent paraffin wax.

2. A barrier coating composition consisting essentially of, by weight, (a) 35 percent ethylene/methyl methacrylate polymer consisting essentially of 75 weight percent of ethylene, 20 weight percent of methyl methacrylate, and 5 weight percent methacrylic acid, (b) 25 percent copolymer consisting essentially of 72 to 75 percent vinyl toluene and 25 to 28 percent alpha-methyl styrene, and (c) 40 percent paraffin wax.

References Cited

UNITED STATES PATENTS

| 3,215,657 | 11/1965 | Beresniewicz | 260—28.5 AV |
| 3,245,931 | 4/1966 | Matthew | 260—28.5 AV |
| 3,294,722 | 12/1966 | Apikos | 260—28.5 AV |
| 3,306,882 | 2/1967 | Pullen | 260—28.5 AV |
| 3,386,936 | 6/1968 | Gordy | 260—28.5 AV |
| 3,429,843 | 2/1969 | Arnold | 260—28.5 AV |
| 3,541,035 | 11/1970 | Baum | 260—28.5 AV |

MORRIS LIEBMAN, Primary Examiner

P. R. MICHL, Assistant Examiner

U.S. Cl. X.R.

260—897 B